United States Patent [19]
Matsuhashi

[11] Patent Number: 5,594,995
[45] Date of Patent: Jan. 21, 1997

[54] TOUCH SENSOR

[75] Inventor: Akira Matsuhashi, Tokyo, Japan

[73] Assignee: Metrol Co., Ltd., Tokyo, Japan

[21] Appl. No.: 542,301

[22] Filed: Oct. 12, 1995

[30] Foreign Application Priority Data

Apr. 6, 1995 [JP] Japan .................................. 7-117595

[51] Int. Cl.⁶ ........................................... G01B 5/012
[52] U.S. Cl. ........................................... 33/558; 33/561
[58] Field of Search .............................. 33/556, 557, 558, 33/559, 560, 561

[56] References Cited

U.S. PATENT DOCUMENTS

| | | | |
|---|---|---|---|
| 4,203,225 | 5/1980 | Nilsson | 33/561 |
| 4,279,080 | 7/1981 | Nakaya | 33/561 |
| 4,288,925 | 9/1981 | McMurtry | 33/561 |
| 4,447,958 | 5/1984 | Tanaka | 33/561 |
| 4,553,001 | 11/1985 | Kroetsch | 33/561 |

FOREIGN PATENT DOCUMENTS

| | | |
|---|---|---|
| 0303831 | 2/1988 | European Pat. Off. . |
| 0307782 | 3/1989 | European Pat. Off. . |
| 3125737 | 3/1982 | Germany . |
| 3713415 | 11/1988 | Germany . |
| 2025073 | 1/1980 | United Kingdom . |

*Primary Examiner*—Thomas B. Will
*Attorney, Agent, or Firm*—Kanesaka & Takeuchi

[57] ABSTRACT

A touch sensor of the invention can output a directional information from which direction an object to be measured touches a contact, as well as a positional information. The touch sensor includes a movable plate; at least four movable contacts provided on the movable plate and arranged in a rectangular shape; a measuring shaft attached to the movable plate to extend perpendicularly thereto and having a contact portion at one end thereof; a base plate situated at a side opposite to the movable contacts and having at least four fixed contacts formed at positions corresponding to the respective movable contacts so that the fixed contacts contact the corresponding movable contacts; a device for uring the movable plate to the base plate so that the movable contacts and the fixed contacts contact together; and insulating guides provided on the base plate or the movable plate to surround the movable and fixed contacts. The guides contact and guide the movable or fixed contacts. When the object to be measured touches the contact portion, adjacent two movable contacts become rotational supporting points, and two movable contacts provided at an opposite side of the adjacent two movable contacts are separated from two fixed contacts corresponding thereto.

8 Claims, 5 Drawing Sheets

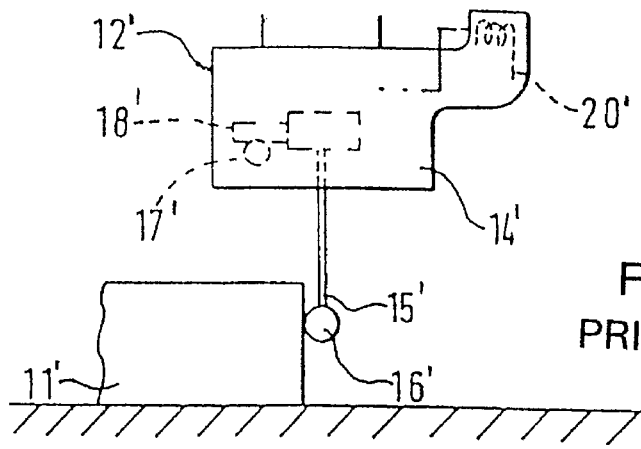
Fig. 9
PRIOR ART
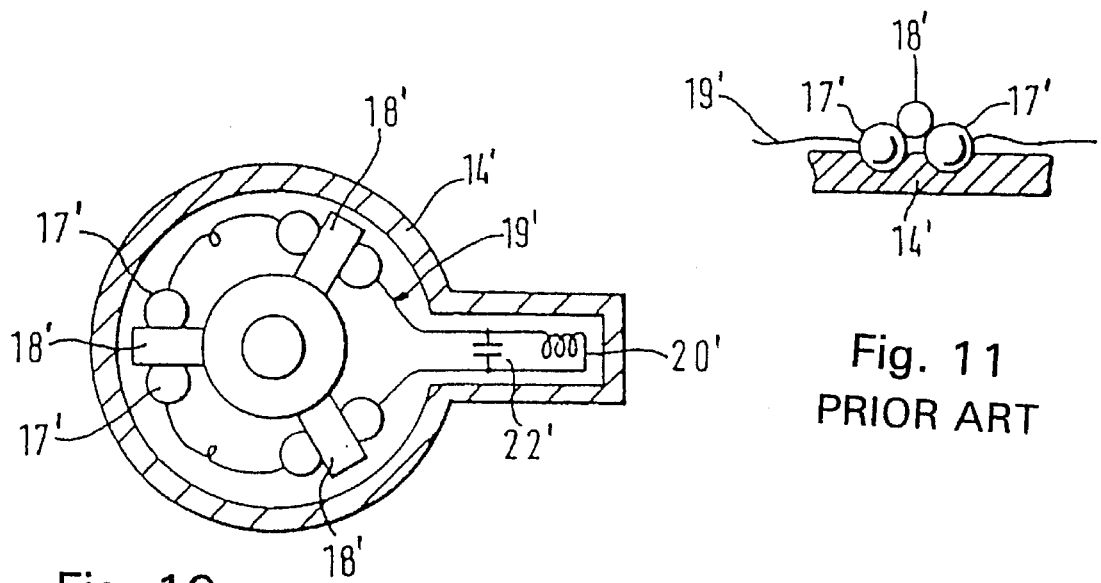
Fig. 11
PRIOR ART
Fig. 10
PRIOR ART

TOUCH SENSOR

BACKGROUND OF THE INVENTION AND RELATED ART STATEMENT

The invention relates to a touch sensor to be used for controlling a dimension or a position of a workpiece.

Conventionally, as a touch probe in a three dimensional measuring system, a structure as disclosed in U.S. Pat. No. 4,339,714 has been well known.

More specifically, in U.S. Pat. No. 4,339,714, as shown in FIGS. 9–11, a probe 12' is provided with a contact 15' having a spherical end 16', which contacts an object 11' to be measured. The contact 15' has the other end provided with three arms 18' arranged radially and housed in a case 14' of the probe 12'. The three arms 18' arranged radially are provided with a pair of electrodes 17', respectively.

The electrodes 17' and a coil 20' are connected in series through a monitoring circuit 19', and a capacitor 22' is arranged parallel to the coil 20'. When a measuring is carried out, the probe 12' is moved so that the contact 15' touches the object 11' to be measured. When the contacts 15' touches the object 11', the contact 15' in a rest state is moved to thereby separate from at least a pair of electrodes 17'. Thus, the circuit 19' is opened. By opening the circuit 19', it is realized that the probe 12' contacts the object to be measured.

In the above structure, in case a position of a tip of a cutting blade, such as a bit of a lathe, is regulated, it is required to measure a position of the tip of the cutting blade along a rotational center line, i.e. X—X' direction of the object to be cut, e.g. positioning a bit for cutting a right side and a bit for cutting a left side, and to measure a position of the tip of the cutting blade in a direction of Y—Y' perpendicular to the X—X' direction, e.g. positioning a flat bit and a drilling bit. In this case, it is impossible to output positional data relative to which direction the data are among the four X, X', Y, Y' directions, as well as a positional information.

As a conventional example wherein a directional information as well as a positional information can be outputted, a plan view of the example is shown in FIG. 7 and a front view thereof is shown in FIG. 8.

More specifically, individual touch sensors 21, 22, 23, 24 are provided on a main body 25 in the four directions of X, X', Y, Y', respectively. Reference numeral 26 represents a flange for fixing the main body 25 to, for example, an end of an arm fixed to a fixing portion on a main shaft side of a lathe.

In the above structure, surfaces to be touched are separated by several tens of millimeters, so that when the sensor is to be fixed to a lathe or the like, there is no space for fixing the sensor. Also, in case two bits are arranged parallel with a narrower space therebetween, which is less than a space between the surfaces to be attached, it is impossible to measure by the sensor. Further, since four touch sensors are provided in respective four directions, a production cost thereof is increased.

Therefore, an object of the present invention is to provide a touch sensor capable of outputting positional data relative to which direction the data relate among the four directions of X, X', Y, Y', as well as a positional information.

Another object of the present invention is to provide a touch sensor as stated above, wherein a distance between surfaces of the sensor to which a bit or the like touches is extremely shortened, so that the sensor is very compact and handy.

A further object of the present invention is to provide a touch sensor as stated above, wherein the sensor can be easily manufactured at a low cost.

Further objects and advantages of the invention will be apparent from the following description of the invention.

SUMMARY OF THE INVENTION

In order to attain the above objects, a touch sensor of the present invention comprises a movable plate including four spherical movable contacts, centers of the respective contacts being arranged at corners of a rectangular portion including a square of an equal length at four sides; a measuring shaft having a contact portion at one end thereof, the measuring shaft projecting from the movable plate to pass through a center of the above rectangular portion and to extend in a direction perpendicular to a surface of the rectangular portion; and a base plate located opposite to the movable contacts and having four fixed contacts at positions corresponding to the respective movable contacts so that the respective movable contacts touch the fixed contacts corresponding thereto by urging means. The base plate is also provided thereon with insulating guides. Each guide has a side surface parallel to one side of the rectangular portion and contacting the adjacent two movable contacts.

When an object to be measured touches the contact in a direction perpendicular to one side of the rectangular portion, adjacent two movable contacts out of the four movable contacts become a rotational support point relative to the fixed contacts and the guides, and two movable contacts located at the opposite side of the adjacent two movable contacts are separated from the two fixed contacts corresponding thereto.

The four movable contacts and the four fixed contacts may be electrically connected in series. Also, the four movable contacts and the four fixed contacts may be electrically connected parallel.

In the serial connection, in case the object to be measured, such as a bit, touches the contact in a direction perpendicular to one side of the rectangular portion formed by connecting centers of the four spherical movable contacts, adjacent two movable contacts out of the four movable contacts become a rotational supporting point relative to the fixed contacts and guides. Therefore, the two movable contacts provided on the opposite side of the adjacent two movable contacts are separated from the two fixed contacts corresponding thereto, and at the instant of the separation, an OFF signal as a positional information is outputted to a control device connected to lead wires in series.

In the parallel connection, in case an object to be measured, such as a bit, touches the contact in a direction perpendicular to one side of a rectangular portion formed by connecting centers of four spherical movable contacts, adjacent two movable contacts out of the four movable contacts become a rotational supporting point relative to the fixed contacts and guides. Therefore, two movable contacts provided on the opposite side of the adjacent two movable contacts are separated from the two fixed contacts corresponding thereto, and at the instant of the separation, an OFF signal is outputted to a control device connected to lead wires which are also connected to the respective movable contacts and fixed contacts. Accordingly, a directional information from which direction the object to be measured touches the contact as well as a positional information can be obtained.

More specifically, two movable contacts on a touching surface side are kept ON, while the movable contacts on the other surface side are in an OFF state, to thereby output the four signals to the control device. Therefore, a directional information from which direction the object to be measured touches the contact as well as a positional information can be obtained.

BRIEF DESCRIPTION OF THE DRAWINGS

FIG. 9 is a side view of another conventional touch sensor;

FIG. 10 is a section view taken along line 9—9 in FIG. 9; and

FIG. 11 is a side view of a part of an arm shown in FIG. 9.

DETAILED DESCRIPTION OF PREFERRED EMBODIMENTS

Figure 1:
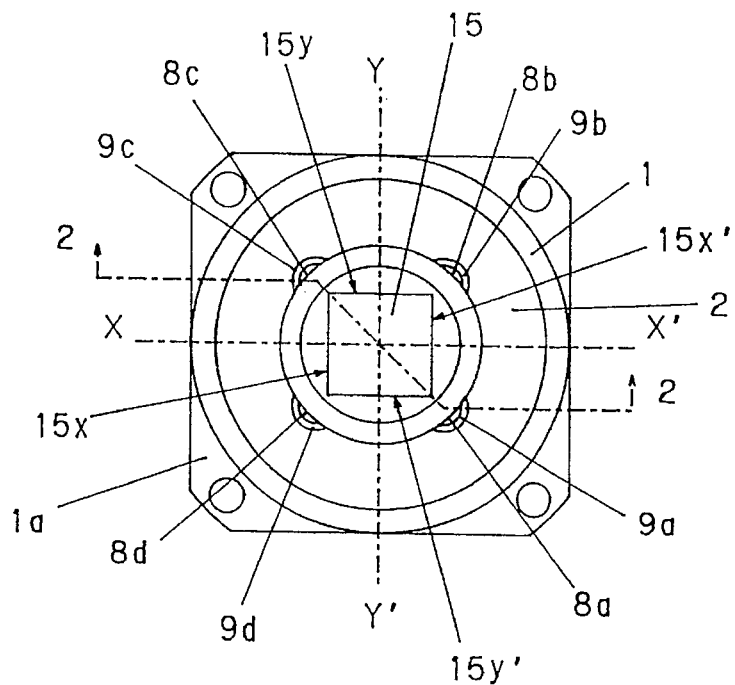
FIG. 1 is a plan view of a touch sensor of the invention.

Referring to the drawings, an embodiment of the invention is explained. FIG. 1 is a plan view of a touch sensor of the present invention, FIG. 2 is a section view taken along line 2—2 in FIGS. 1 and 3, and FIG. 3 is a section view taken along line 3—3 in FIG. 2.

Figure 2:
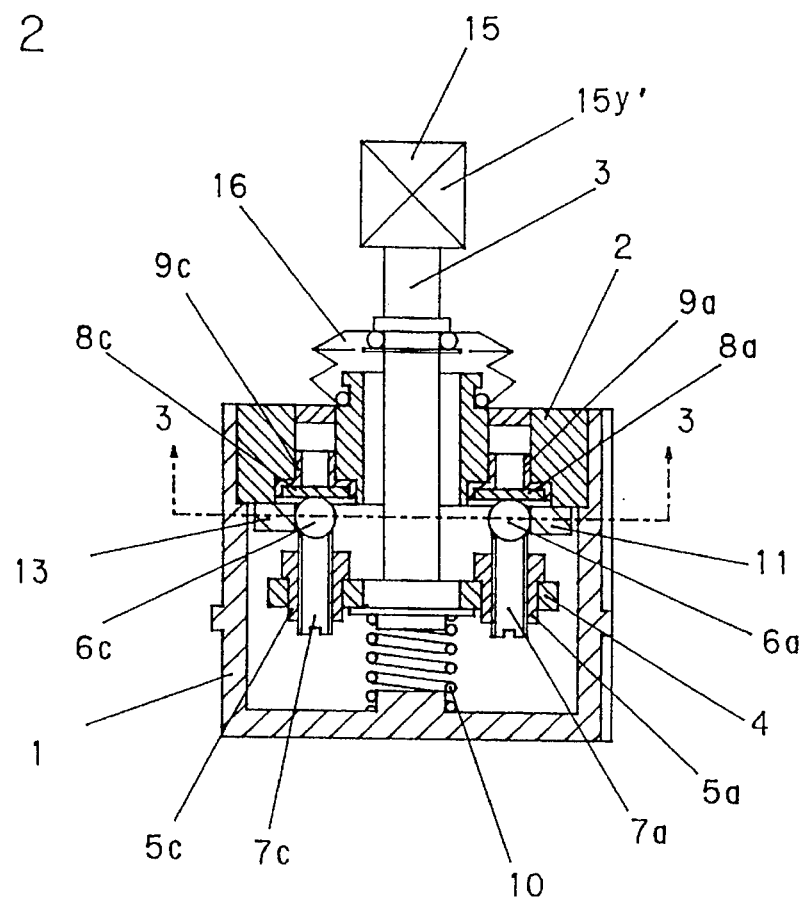
FIGS. 2 is a section view taken along line 2—2 in FIGS. 1 and 3.
Figure 3:
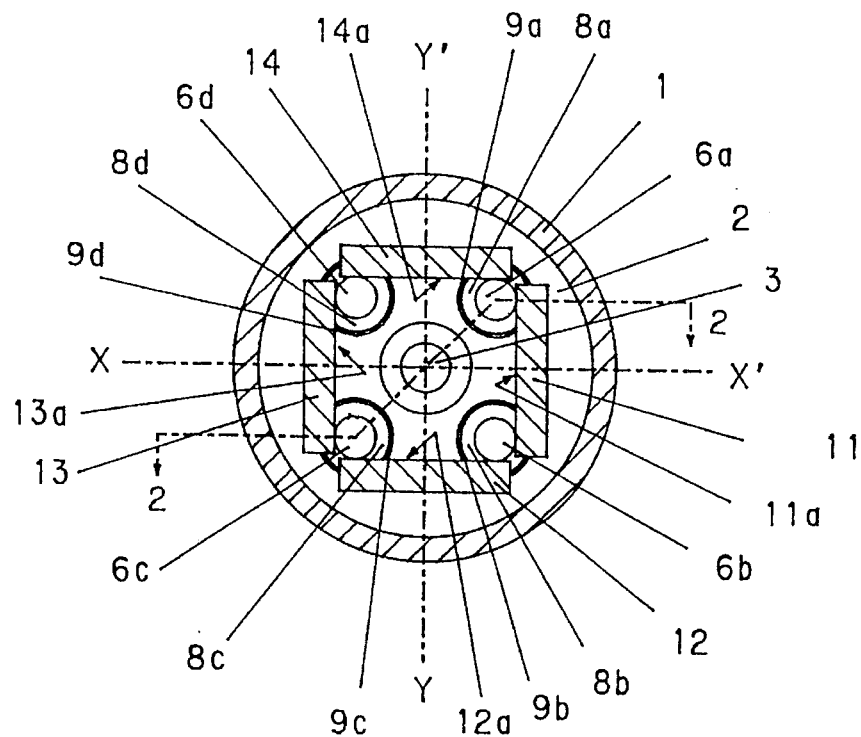
FIG. 3 is a section view taken along line 3—3 in FIG. 2.

In FIGS. 1, 2 and 3, reference numeral 1 represents a housing, and numeral 2 represents a base plate. A measuring shaft 3 passing through a central hole of the base plate 2 projects above the housing 1 at one end. A movable plate 4 located inside the housing 1 is connected at the other end of the shaft 3. Four sleeves 5a, 5b, 5c and 5d (5a and 5c are only shown in FIG. 2) made of an insulating material and having an internal thread are fixed to the movable plate so that a central line of each internal thread is parallel to a central line of the measuring shaft 3. Screws 7a, 7b, 7c, 7d (7a and 7c are only shown in FIG. 2) have spherical movable contacts 6a, 6b, 6c, 6d at the respective terminal ends and are screwed into the respective internal threads.

On the other hand, in an inner surface of the base plate 2, fixed contact plates 8a, 8b, 8c, 8d made of an electroconductive hard material are held parallel to the inner surface of the base plate 2 at positions approximately opposite to the spherical movable contacts 6a, 6b, 6c, 6d by holders 9a, 9b, 9c, 9d made of an insulating material.

The movable plate 4 is urged by a compressing coil spring 10 provided between an inner surface of the housing 1 and one end of the measuring shaft 3 toward a direction so that the spherical movable contacts 6a, 6b, 6c, 6d contact the respective fixed contact plates 8a, 8b, 8c, 8d opposing thereto. In this respect, after the screws 7a, 7b, 7c, 7d are finely adjusted so that the respective spherical movable contacts contact all the fixed contact plates, the screws 7a, 7b, 7c, 7d are permanently fixed to the sleeves 5a, 5b, 5c, 5d by an adhesive or the like.

Four imaginary lines connecting centers of the spherical movable contacts 6a, 6b, 6c, 6d adjusted and fixed as described above form a rectangular shape or a square with four sides of equal lengths. For explanation, the present embodiment is explained as the square shape with four sides of the equal lengths.

The square portion is perpendicular to the central line of the measuring shaft 3, and a center of the square portion coincides with a center of the measuring shaft 3. Also, imaginary lines connecting centers of the respective sides of the square portion and the center of the measuring shaft 3 are expressed as X—X' and Y—Y', respectively, as shown in FIGS. 1 and 3.

Guides 11, 12, 13, 14 in a square-bar shape made of an insulating material are disposed in the inner surface of the base plate 2. The respective guides are arranged on the base plate 2 such that the spherical movable contacts 6a, 6b lightly contact an inner side surface 11a of the guide 11; the spherical movable contacts 6b, 6c lightly contact an inner side surface 12a of the guide 12; the spherical movable contacts 6c, 6d lightly contact an inner side surface 13a of the guide 13; and the spherical movable contacts 6d, 6a lightly contact an inner side surface 14a of the guide 14. The guides are tentatively fixed by screws or the like to the base plate 12, and then securely fixed thereto by an adhesive or the like. The respective square-bar shaped guides 11, 12, 13, 14 function such that the respective spherical movable contacts 6a, 6b, 6c, 6d always contact the fixed contact plates 8a, 8b, 8c, 8d at constant positions, respectively.

A square-bar shaped contact portion 15 made of a very hard material and contacting a machining tool which is an object to be measured is integrally fixed to the projected end of the measuring shaft 3. The surfaces 15x, 15x' of the contact 15 are perpendicular to the central line X—X', while the surfaces 15y, 15y' are perpendicular to the central line Y—Y'.

Incidentally, reference numeral 1a is a flange integrally formed with the housing 1, and is used, for example, to fix the housing 1 to a terminal end of an arm fixed to a fixing position on a main shaft side of a cutting machine. Also, numeral 16 represents a rubber boot or cover to prevent dust from entering into an inner space formed by the housing 1 and the base plate 2.

Figure 4:
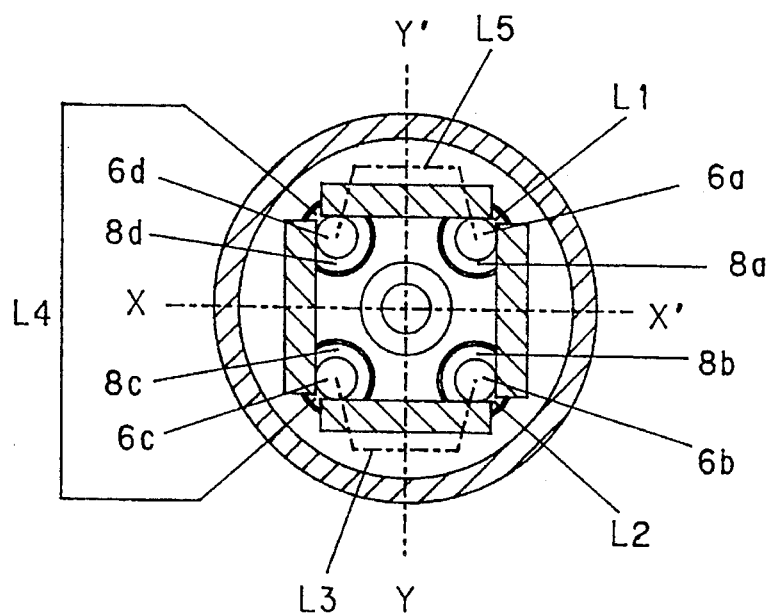
FIG. 4 is a wiring diagram.

FIG. 4 shows a wiring. On a side of the spherical movable contacts, the spherical movable contacts 6b and 6c are connected by a lead wire L3, and the spherical movable contacts 6a, 6d are connected by a lead wire L5. On a side of the fixed contact plates, the fixed contact plates 8c, 8d are connected by a lead wire L4, while one end of a lead wire L1 is connected to the fixed contact plate 8a and one end of a lead wire L2 is connected to the fixed contact plate 8b. The other ends of the respective lead wires L1 and L2 are connected to a control device (not shown).

In other words, the lead wires L1 and L2 are connected in series to the control device through the fixed contact plate 8a, the spherical movable contact 6a, the spherical movable contact 6d, the fixed contact plate 8d, the fixed contact plate 8c, spherical movable contact 6c, the spherical movable contact 6b and the fixed contact plate 8b.

Figures 5, 6:
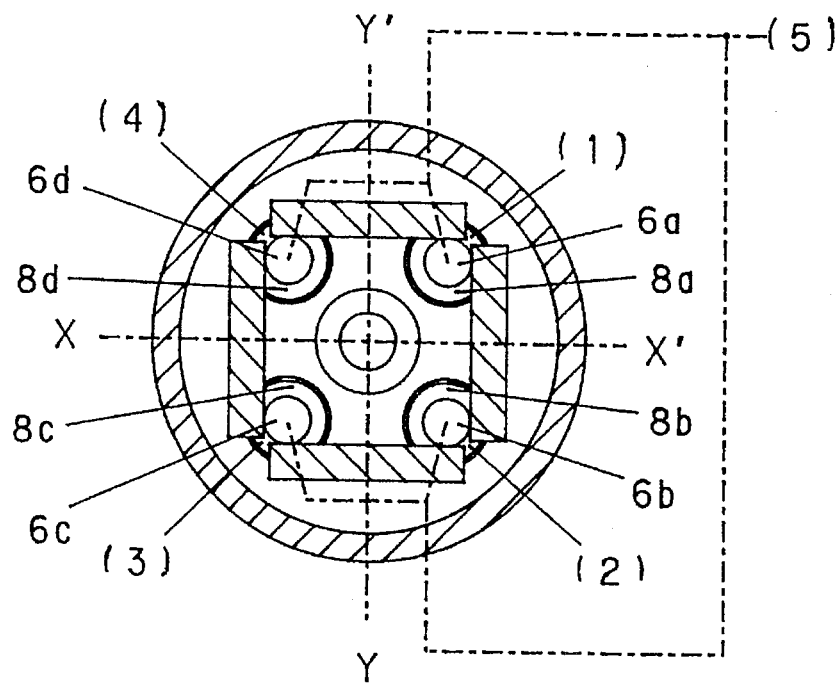
FIG. 5 is another wiring diagram.
FIG. 6 is a table showing a relationship between contact directions and outputs of lead wires.
Figure 7:
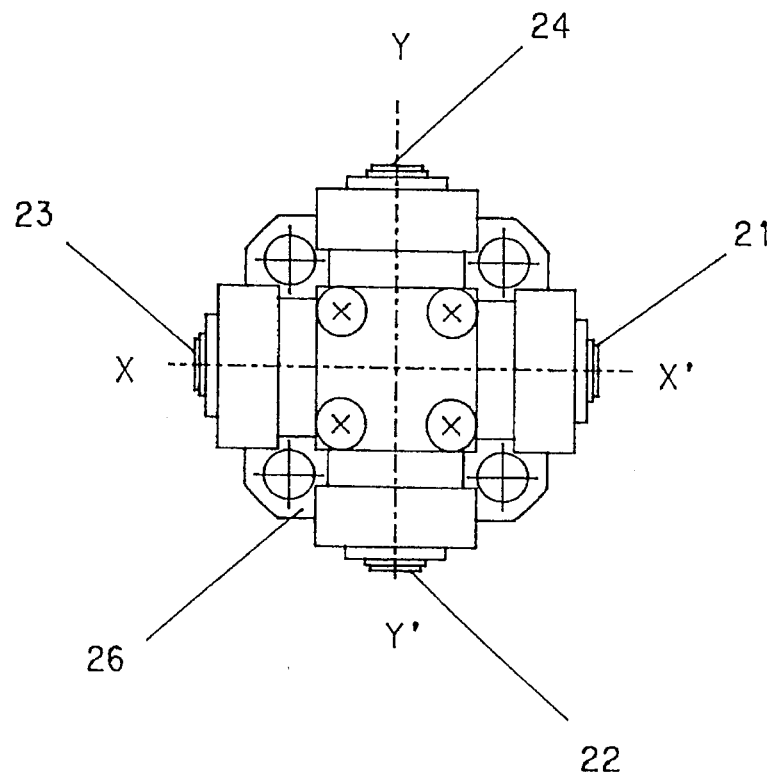
FIG. 7 is a plan view of a conventional touch sensor.
Figure 8:
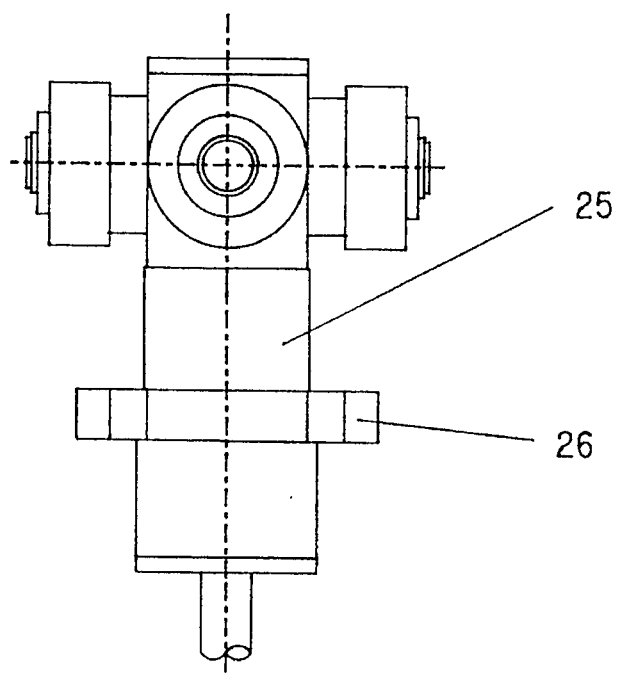
FIG. 8 is a front view of the conventional touch sensor of FIG. 7.

FIG. 5 shows another wiring. The respective fixed contact plates 8a, 8b, 8c, 8d are connected to one ends of lead wires (1), (2), (3), (4), respectively, and the other ends of the lead wires are connected to a control device (not shown). The spherical movable contacts 6a, 6b, 6c, 6d are gathered and connected to one end of a lead wire (5), and the other end of the wire (5) is connected to the above control device.

In other words, all the lead wires (1), (2), (3), (4) and the lead wire (5) are connected parallel to the control device.

FIG. 6 shows signals outputted by the respective lead wires (1), (2), (3), (4) in the four directions of X, X', Y, Y' where an object to be measured contacts the contact 15 in a parallel connection as shown in FIG. 5. O represents an ON signal, and X represents an OFF signal.

Next, an operation of the sensor of the invention is briefly described. In the serial connection as shown in FIG. 4, when an object to be measured, such as a bit, contacts the surface 15x of the contact 15, the measuring shaft 3 inclines toward a right side in FIG. 2 around the centers of the spherical movable contacts 6c, 6d, which are guided by the fixed contact plates 8c, 8d and side surfaces 12a, 13a, 14a of the guides 12, 13, 14. Also, the spherical movable contacts 6a, 6b are separated from the fixed contact plates 8a, 8b. At an instant of the separation of the spherical movable contacts 6a, 6b, conduction between the lead wires L1, L2 is interrupted, and an OFF signal as a positional information is outputted to the control device connected to the lead wires L1, L2.

Similarly, when a bit contacts the respective surfaces 15x', 15y, 15y' of the contact 15, conduction between the lead wires L1 and L2 is interrupted, and an OFF signal is outputted to the control device connected to the lead wires.

In the parallel connection as shown in FIG. 5, in case the bit contacts the surface 15x of the contact 15, conduction between the lead wires (3) and (5) and conduction between the lead wires (4) and (5) are maintained. However, the spherical movable contacts 6a, 6b are separated from the fixed contact plates 8a, 8b, and at the instant of the separation, conduction between the lead wires (1) and (5) and conduction between the lead wires (2) and (5) are interrupted.

Similarly, conducting conditions when the bit contacts the surfaces 15x', 15y, 15y' of the contact 15 are shown in FIG. 6, with an O mark in case of conduction between the lead wire (1), (2), (3) or (4) and the lead wiring (5), and with an X mark in case of interruption therebetween. The combination of O and X signals is outputted to the control device as ON and OFF signals, so that a directional information from which direction the bit touches the contact 15 as well as a positional information can be obtained when the bit touches the contact 15.

In the present embodiment, the measuring shaft 3 and the contact 15 project above the base plate 2 as shown in FIG. 2, but the measuring shaft 3 and the contact 15 may project downwardly from a lower part of the housing 1.

In this case, it is also possible to control a position in a direction (Z—Z' direction) of a central axle of the measuring shaft 3 in addition to the directions of X—X' and Y—Y'. In the serial connection as shown in FIG. 4, in case all four contacts are separated simultaneously or any one of the four contacts is separated at first, an OFF signal is outputted.

In the parallel connection as shown in FIG. 5, by interrupting all the conducts of the lead wires (1), (2), (3), (4), a directional information where the direction is changed to a Z direction as well as the positional information may be outputted.

Further, in the present embodiment, while the contact 15 has a square shape, the contact 15 may be of any shape, such as cylinder or sphere depending on an object to be measured.

Furthermore, in FIG. 5, although the four spherical movable contacts are connected to a common lead wire, separate lead wires may be used, or four fixed contacts may be connected to a common lead wire.

Similarly, the present invention is not confined to the above embodiments provided that it does not exceed the scope of the present invention.

According to the present invention, since a distance between a bit and a surface of a contact where the bit touches is extremely shortened, it is possible to obtain a compact and handy touch sensor capable of controlling positions in the four directions of X, X', Y and Y'.

Also, it is possible to obtain a touch sensor capable of outputting to a control device a directional information from which direction a bit touches a contact, when the bit touches the contact, among the positional control in the four directions of X, X', Y, Y', as well as a positional information.

Furthermore, it is possible to obtain a low-cost touch sensor capable of controlling positions including positional information in the four directions of X, X', Y and Y' by one switch mechanism.

What is claimed is:

1. A touch sensor for obtaining directional and positional data, comprising:

a movable plate;

at least four movable contacts provided on said movable plate, said movable contacts being arranged in a rectangular shape;

a measuring shaft attached to the movable plate to extend perpendicularly thereto, said measuring shaft having a contact portion at one end thereof;

a base plate situated at a side opposite to said movable contacts and having at least four fixed contacts formed at positions corresponding to said respective movable contacts so that the fixed contacts contact the corresponding movable contacts;

means for urging the movable plate to the base plate so that the movable contacts and the fixed contacts contact together; and insulating guides provided on one of said base plate and said movable plate to surround the movable and fixed contacts, said guides contacting and guiding one of the movable and fixed contacts so that when an object to be measured touches said contact portion, a first two of said movable contacts which are adjacent to each other become rotational supporting points, and a second two of said movable contacts which are adjacent to each other provided at an opposite side of said first two adjacent movable contacts are separated from two of said fixed contacts corresponding thereto.

2. A touch sensor according to claim 1, wherein one of said movable contacts and said fixed contacts projects toward the other of said movable contacts and said fixed contacts, said insulating guides being provided at said other of the movable and fixed contacts and contacting said one of the movable and fixed contacts which projects.

3. A touch sensor according to claim 2, wherein each of said movable contacts projects toward the base plate and has a spherical shape portion, said insulating guides surrounding and contacting at side portions thereof the spherical shape portions of the movable contacts.

4. A touch sensor according to claim 3 further comprising a housing containing the movable plate therein, said urging means being disposed between the housing and the movable plate.

5. A touch sensor according to claim 4, wherein said base plate includes a hole, through which said measuring shaft extends tiltably.

6. A touch sensor according to claim 1, wherein said contact portion of the measuring shaft has four side surfaces, said four side surfaces being arranged to correspond to the rectangular shape of the movable contacts.

7. A touch sensor according to claim 1, wherein said at least four movable contacts and said fixed contacts are electrically connected in series.

8. A touch sensor according to claim 1, wherein said at least four movable contacts and said fixed contacts are electrically connected in parallel.

* * * * *